Figure 1:
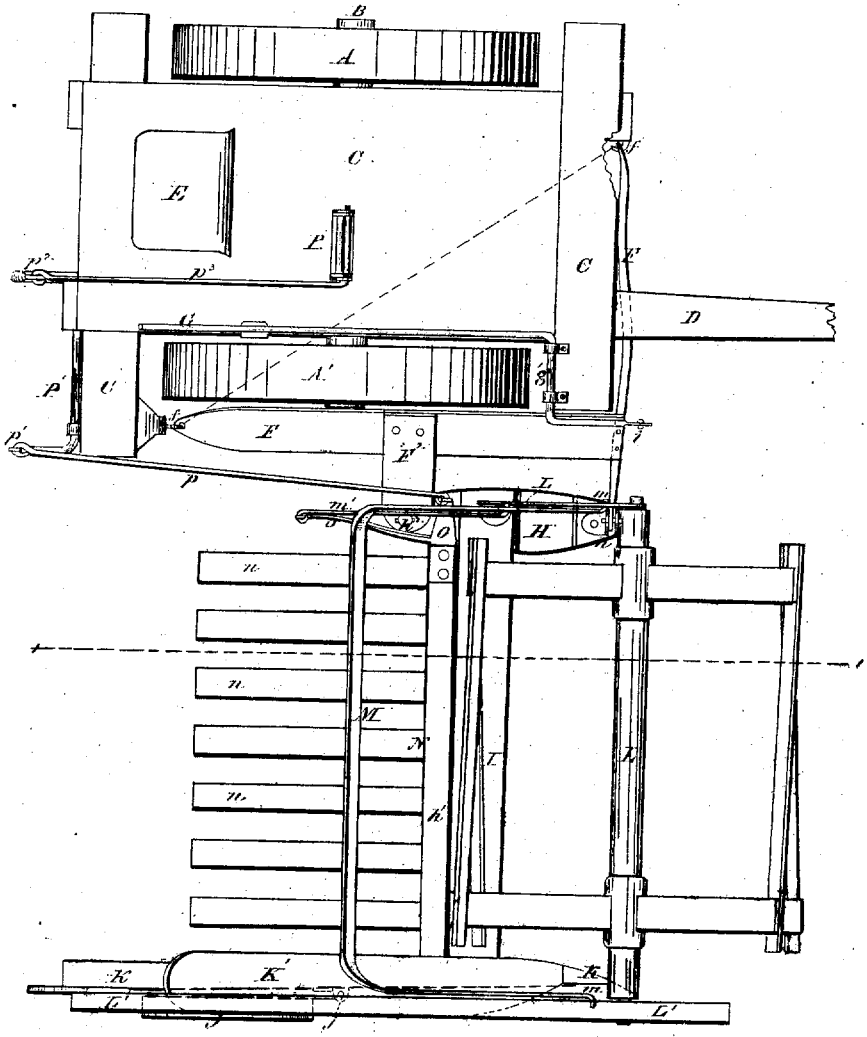

J. F. Seiberling.

Harvester Dropper.

No 3049 Reissued Jul. 21, 1868.

Witnesses.
Jos. S. Pryor
Ballou De Long

Inventor:
John F. Seiberling
by his Atty
B. Benning Upson

J. F. Seiberling.

Harvester Dropper.

No 3049 Reissued Jul. 21, 1868

Witnesses

Jos. S. Peyton
Baltis De Long

Inventor

John F. Seiberling
by his Attys
Baldwin & Son

UNITED STATES PATENT OFFICE.

JOHN F. SEIBERLING, OF AKRON, OHIO.

IMPROVEMENT IN HARVESTERS.

Specification forming part of Letters Patent No. 33,496, dated October 15, 1861; reissue No. 1,699, dated June 14, 1864; reissue No. 3,049, dated July 21, 1868.

*To all whom it may concern:*

Be it known that I, JOHN F. SEIBERLING, formerly of Doylestown, in the county of Wayne and State of Ohio, but now residing at Akron, in the county of Summit and State aforesaid, have invented certain new and useful Improvements in Harvesters, of which the following is a full, clear, and exact description:

The improvements herein claimed consist, first, in a novel method of combining, in a harvester, a platform, oscillating on an axis parallel with the finger-beam, with a device, operated directly by the foot of the driver, for inclining the platform to discharge the gavel; second, in a novel method of combining, in a harvester, two main wheels, a main frame, a finger-beam, suspended from the main frame by flexible connections, a platform, oscillating on an axis parallel with the finger-beam, and a device, operated by the driver, for inclining the platform; third, a novel method of combining, in a harvester, two wheels, a main frame, a laterally-projecting finger-beam, suspended from the main frame by flexible connections, a platform, oscillating on an axis parallel with the finger-beam, and connected with the main frame through the medium of the finger-beam only, and a device, operated by the driver, for inclining the platform; fourth, in a novel method of combining, with a harvester-platform, which is inclined to discharge the gavel, a double-cranked rocking lever, and a treadle, operated by the driver; fifth, in a novel method of combining, with a harvester-platform, which is inclined to discharge the gavel, an arm on the platform, vibrated through connecting-rods, cranks, and a treadle, by the driver from his seat; sixth, in a novel method of combining, in a harvester, an arm, vibrated with the platform, a cut-off connected with the arm, and link-rods, cranks, and a treadle, operated by the driver, whereby the cut-off is actuated by the same devices as those that oscillate the platform.

To carry out the objects of the invention herein claimed, I mount a suitable main frame on two wheels, and connect a laterally-projecting finger-beam with the main frame by flexible connections, which will permit the finger-beam to conform to the undulations of the ground over which it travels. Behind this finger-beam I arrange a platform, pivoted to oscillate vertically on an axis parallel to the finger-beam, so as to discharge the gavel when the platform is inclined. An arm or lever on this platform is connected with suitable devices on the main frame, operated by the driver, to oscillate the platform as required.

It is difficult to connect an oscillating platform with a device operated by the driver from his seat on a two-wheeled machine, as the inner supporting-wheel is in the way of directly making the connection.

To overcome this difficulty I employ a double-cranked rocking-lever, which may have any suitable location between the devices operated by the driver and the platform. A reel is mounted in suitable supports on the main frame, and driven in any proper well-known way. A cut-off is also arranged to vibrate over the platform, at suitable intervals, to receive the grain which falls, while that already accumulated on the platform is being discharged. This cut-off is operated by the same devices that move the platform.

These parts are intended to be used in connection with a fully-organized harvesting-machine.

Figure 2:
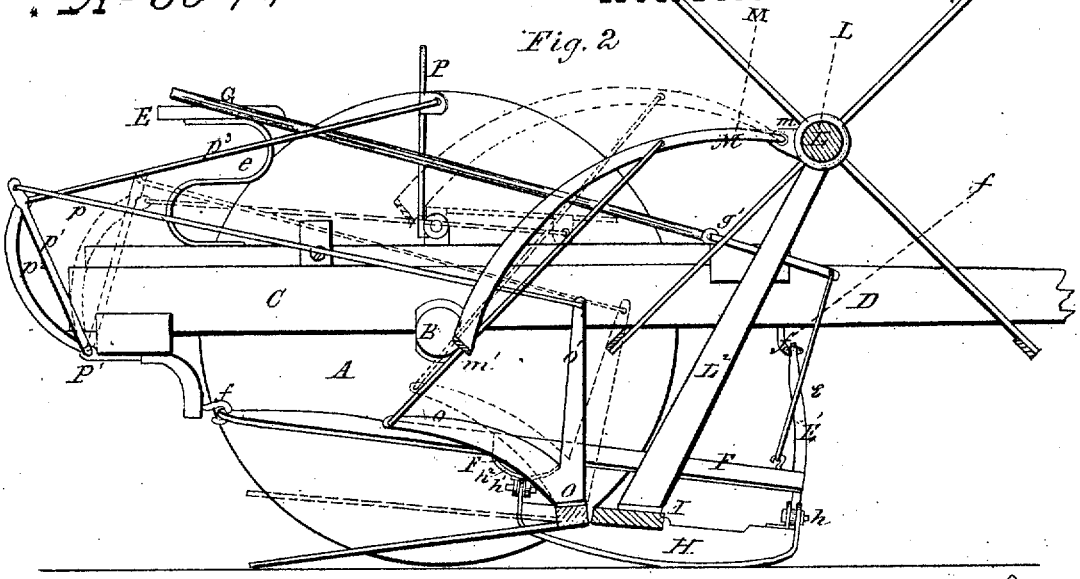
Figure 3:
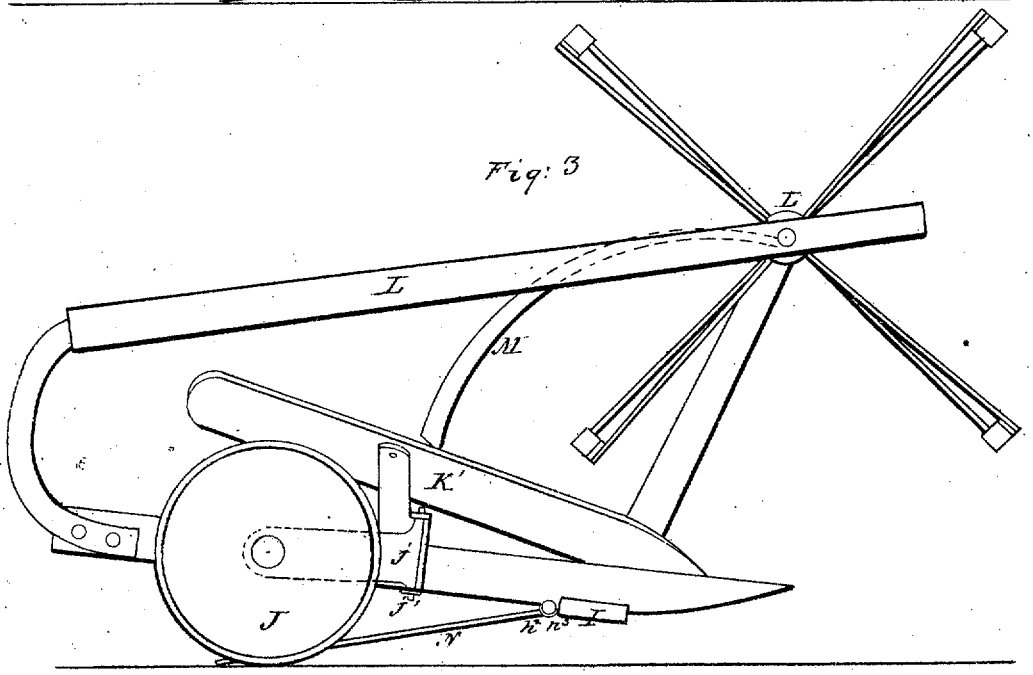

In the accompanying drawings, which exemplify one practical way of carrying out the objects of my invention, Figure 1 represents a plan or top view of so much of a harvester, embracing my improvements, as is necessary to illustrate the invention herein claimed, with the parts in the attitude they assume when reaping grain. Fig. 2 represents a vertical transverse section through the machine at the line 1 1 of Fig. 1, looking toward the main frame. Fig. 3 represents a view, in elevation, of the grain side of the machine.

Two driving and supporting wheels, A A′, are shown as mounted on an axle, B, turning in suitable bearings in a main frame, C, arranged between the wheels, but projecting beyond their peripheries at each end. A tongue, D, projects from the frame near its inner front corner, and a driver's seat, E, is mounted on a curved support near the outer rear corner of the frame. A strong brace-bar, F, is pivoted at its rear end to the main frame by a swivel-joint, $f$, and rigidly secured at its forward end to a coupling-arm, F′, arranged transversely thereto, and attached by a link-joint, $f'$, to the under side of the main frame near its outer front corner. By reference to Fig. 1 it will be seen that the upper end of this coupling-arm is bent, so that a line passing through it at a right angle thereto would intersect the joint $f$, as shown by the red dotted line, owing to which arrangement the finger-beam can be raised or lowered without cramping the joints. This raising and lowering is done, in this instance, by a hand-lever, G, extending forward from a point within reach of the driver, turning on a fulcrum, $g'$, on the main frame, and connected with the brace-bar F by a rod or chain, $g$. The finger-beam I is securely fastened to a shoe, H, pivoted at its toe by a joint, $h$, to the coupling-arm $F^1$, and at its heel by a similar joint, $h^1$, to a short link, $h^2$, swiveling in the overhanging arm $F^2$ on the coupling-brace F.

By this mode of construction the finger-beam can be swung horizontally backward until it lies parallel with the driving-wheels. To do this the pitman and the joint $h$ must, of course, be uncoupled.

The grain end of the finger-beam is provided with a suitable driver, K, and grain-board K′. In this instance, the rear end of the divider is prolonged to form a support for a caster-wheel, J, mounted on an arm, $j$, turning in bearings $j'$, inclined slightly forward from a vertical line.

By this mode of construction, when the finger-beam is turned back parallel with the driving-wheels, the caster-wheel swings out at a right angle to its supporting-arm K, and runs in a path parallel to the driving-wheels, and still supports its end of the finger-beam, thus preventing the torsion of the joint $h^2$.

A reel, L, is mounted in an overhanging arm, $L^1$, mounted on the divider-piece, K, and on a post, $L^2$, secured upon the heel end of the finger-beam. The reel may be driven in any well-known way. In mowing, the reel may be removed, if preferred.

In reaping, when the grain is to be discharged in gavels, I employ a cut-off, consisting, in this instance, of a bail or rod, M, bent so as to form three sides of a parallelogram, and having its ends pivoted in sockets $m$, in the reel-supports L $L^1$. The rod M oscillates in a vertical path outside of the reel, and, when interposed between the reel and platform, receives the grain which is cut and falls during the discharge of the gavel, thus acting as a cut-off to prevent the falling grain from mingling with the gavel already accumulated on the platform.

The platform N consists of a series of parallel slats, $n$, arranged at right angles to a rock-shaft, $n^1$, to which their forward ends are attached. This rock-shaft oscillates in a bearing, $n^2$, in the shoe H, and in a corresponding one, $n^3$, in the divider, and the parts are so arranged that the platform may readily be removed, whenever desired.

A bifurcated standard, O, is mounted on the rock-shaft $n^1$, and has its rear branch $o$ connected by a link-rod, $m'$, with the cut-off M, by which means the platform and cut-off are caused to act in unison, as hereinafter explained.

The platform is oscillated on its axis $n^1$ by a link-rod, $p$, attached at one end to the standard $o'$, and at the other to the bent arm $p^1$ of a rock-shaft, P′, on the rear end of the main frame. Another crank-arm, $p^2$, on the other end of this rock-shaft, is connected by a link-rod, $p^3$, with a vibrating foot-lever, P, pivoted on the main frame within easy reach of the driver, who can thus, by a single forward movement of his foot, depress the rear end of the platform to discharge the gavel and interpose the cut-off to receive the falling grain, and by reversing these movements can raise the platform and withdraw the cut-off.

As the machine advances through the field the reel sweeps the standing grain back against the cutting apparatus by which it is severed; the continued backward revolution the reel then deposits the cut grain on the platform. When grain enough to form a gavel of sufficient size has accumulated on the platform, the driver, with his foot, depresses the foot-lever P, which, through the medium of the crank-lever P′ and link-rods $p$ $p^3$, rocks the shaft $n^1$ by which only the platform is sustained, and thus depresses the rear end of the platform and allows the grain to slide off. As the rear end of the platform drops, the stubble enters between its slats and catches the stalks lying thereon; the forward motion of the machine then withdraws the platform and leaves the gavel lying upon the ground with its stalk nearly parallel to the path of the machine. The slats are unsupported at their rear ends, and have the spaces between them left open to prevent the grain from catching, and to allow the stubble to comb, as it were, the grain from the slats or teeth.

Simultaneously with the dropping of the platform, the cut-off M is drawn down by its link-rod $m'$ and swings in under the reel and over the platform to receive the grain which falls during the descent of the platform. As soon as the gavel is discharged the driver reverses the movements of the levers, which movement raises the platform, swings the cut-off out of the way, and the grain upon the latter falls on the platform as before.

I thus secure an effective method of discharging the grain in gavels by the use of devices very light and simple in their construction.

What I claim herein is—

1. The combination, in a harvester, substantially as set forth, of a platform oscillating on an axis parallel with the finger-beam, with a device operated directly by the foot of the driver, for inclining the platform to discharge the gavel.

2. The combination, substantially as set forth, in a harvester, of two main wheels, a frame to support the gearing, a finger-beam suspended from the frame by flexible connections, an oscillating platform, and a device, operated by the driver for inclining the platform.

3. The combination, substantially as set forth, in a harvester, of two wheels, a main or gearing frame, a laterally-projecting finger-beam, suspended from the main frame by flexible connections, a platform oscillating on an axis parallel with the finger-beam and connected with the main frame through the medium of the finger-beam only, and a device to operate the platform from the driver's seat.

4. The combination, substantially as set forth, with a harvester-platform, of a double-cranked rocking-leaver and a treadle, operated by the driver for the purpose set forth.

5. The combination, substantially as set forth, with a harvester-platform, of a treadle, P, a rod, $p^3$, a lever, P′, a connecting-rod, $p$, and an arm, O, for the purpose set forth.

6. The combination, in a harvester, substantially as set forth, of a cut-off, with a rod, $m'$, arms $o$ $o'$, a rod, $p$, a lever, P′, a rod, $p^3$, and a treadle, P, whereby the cut-off is operated by the same devices as those which operate the platform.

J. F. SEIBERLING.

Witnesses:
WM. M. CUNNINGHAM,
A. MALCOLM.